United States Patent [19]

Hashimoto et al.

[11] Patent Number: 4,590,123
[45] Date of Patent: May 20, 1986

[54] LOW-RESILIENCE RUBBER COMPOSITIONS AND FOAMS

[75] Inventors: Takatsugu Hashimoto, Higashimurayama; Takashi Ohashi, Iruma, both of Japan

[73] Assignee: Bridgestone Tire Co., Ltd., Tokyo, Japan

[21] Appl. No.: 755,563

[22] Filed: Jul. 16, 1985

Related U.S. Application Data

[60] Division of Ser. No. 640,365, Aug., 1984, Pat. No. 4,546,127, which is a continuation of Ser. No. 484,510, Apr. 13, 1983, abandoned.

[30] Foreign Application Priority Data

Apr. 13, 1982 [JP] Japan .................. 57-60429
Nov. 25, 1982 [JP] Japan .................. 57-205551

[51] Int. Cl.$^4$ ............................................ C08V 9/32
[52] U.S. Cl. .................... 428/316.6; 156/60; 428/317.9; 521/91; 521/92; 521/139; 521/148; 521/541; 523/219; 524/432; 524/437; 524/444; 524/445; 524/447; 524/448; 524/449; 524/450; 524/451; 524/456; 525/215; 525/233; 525/237
[58] Field of Search ............... 521/91, 92, 139, 148, 521/541; 156/60; 428/316.6, 317.9; 524/413, 423, 424, 426, 432, 437, 444, 445, 447, 448, 449, 450, 451, 456; 523/219; 525/215, 233, 237

[56] References Cited

U.S. PATENT DOCUMENTS

| | | | |
|---|---|---|---|
| 2,763,897 | 9/1956 | Gates et al. | 521/148 |
| 2,806,255 | 9/1957 | Dietz | 521/148 |
| 2,849,028 | 8/1958 | Clark et al. | 521/139 |
| 2,873,259 | 2/1959 | Clark | 521/139 |
| 2,873,481 | 2/1959 | Semegen | 521/139 |
| 2,999,822 | 9/1961 | Pfan et al. | 521/139 |
| 3,519,578 | 7/1970 | Allen | 521/148 |
| 4,256,850 | 3/1981 | Thorsud | 521/139 |
| 4,352,854 | 10/1982 | Seidenstrang et al. | 521/51 |
| 4,546,127 | 10/1985 | Hashimoto et al. | 523/219 |

*Primary Examiner*—Morton Foelak
*Attorney, Agent, or Firm*—Birch, Stewart, Kolasch & Birch

[57] ABSTRACT

A soft, low-resilience, cured rubber composition is prepared by mixing
(a) 100 parts by weight of a polymeric material comprising a styrene-butadiene copolymer or styrene-butadiene copolymer mixture having a styrene content of 53 to 75% by weight, and 0 to 40% by weight of the polymeric material of another rubber ingredient,
(b) 30 to 300 parts by weight of a filler, and
(c) 5 to 100 parts by weight of a plasticizer, adding effective amounts of a vulcanizing agent and a vulcanizing accelerator to the mixture, and then heat curing the mixture. A similar composition further containing a foaming agent may be heat cured into a low-resilience rubber foam. Rubber and foamed rubber compositions have improved vibration-attenuating and shock-absorbing properties.

35 Claims, 4 Drawing Figures

LOW-RESILIENCE RUBBER COMPOSITIONS AND FOAMS

This application is a divisional of co-pending application Ser. No. 640,365, filed on Aug. 13, 1984, now U.S. Pat. No. 4,566,127 which is a continuation of application Ser. No. 484,510 filed Apr. 13, 1983, now abandoned.

BACKGROUND OF THE INVENTION

This invention relates to rubber and foamed rubber compositions which retain low resilience over a wide temperature range of from $-10°$ C. to $50°$ C. and are soft at room temperature. More particularly, this invention relates to rubber and foamed rubber compositions which comprise a styrene-butadiene copolymer or a mixture of styrene-butadiene copolymers having a high styrene content, and relatively large amounts of a filler and a plasticizer, and which have improved vibration-attenuating and shock-absorbing properties at frequencies of 0.01–1000 Hz due to their remarkably low hardness, improved energy- and shock-absorbing ability due to their low resilience over a wide temperature range from $-10°$ C. to $50°$ C., and an increased tensile strength.

A number of rubber compositions which are soft at room temperature are known in the art, including compositions based on polynorbornene as disclosed in Japanese Patent Application Kokai No. 56-74801, compositions based on ethylene-vinyl acetate copolymers as disclosed in Japanese Patent Publication No. 53-3244, and compositions based on urethane elastomers as disclosed in Japanese Patent Application Kokai No. 52-54000. These compositions, however, were inadequate for practical application because some had a resilience as high as 40 to 90% or a reduced tensile strength of less than 50 kg/cm$^2$, and none of them satisfied both low resilience and high tensile strength. Low-resilience rubber compositions were also proposed which were based on butyl rubber or modified rubbers. However, they were temperature dependent and had increased hardness.

Most conventional sponge rubbers prepared using organic foaming agents are highly resilient. As far as the inventors know, few investigations have been made on low-resilience sponge rubbers. As to foamed materials, some of foamed polyurethanes have low resilience (see Japanese Patent Application Kokai No. 55-137123, and Japanese Patent Publication Nos. 46-34630, 48-38467, and 50-52175, for example), although they have poor shock-absorbing properties and often become unstable with temperature change. In addition, these foamed polyurethanes are known to be inferior in water resistance and heat deterioration to sponge rubbers, and they are also unsatisfactory in actual application.

The current general trend in the rubber industry is toward light weight products. For low-resilience rubber compositions, it is desired to render them light weight to make them more valuable. However, simply foaming conventional low-resilience rubber compositions with the aid of an organic foaming agent will result in foams having increased resilience because the resilience is largely affected by the introduced closed cells containing gases.

SUMMARY OF THE INVENTION

Undertaking extensive research for the purpose of obtaining a rubber composition which can meet the requirements of low hardness, low resilience, and high tensile strength at the same time, it has been found that a rubber composition comprising a styrene-butadiene copolymer or a mixture of styrene-butadiene copolymers having a preponderant styrene content, and specific amounts of a filler and a plasticizer meets the three requirements in a cured state. This rubber composition, when a foaming agent is further added, may be expanded, at no expense to the low resilient, into a low-resilience light-weight rubber foam.

Accordingly, an object of the present invention is to provide a rubber composition characterized by a semi-liquid nature, low hardness and high mechanical strength, which make it suitable for use in acoustic parts such as turntable sheets, vibration-damping materials, shock-absorbing materials, earthquake-insulating materials, sound-insulating materials and the like.

It is another object of the present invention to provide a rubber foam characterized by a light-weight and semi-liquid nature which make it suitable for use in acoustic parts such as turntable sheets, vibration-damping material, shock-absorbing materials, earthquake-insulating materials, sound-insulating materials, various grips, insoles and soles of shoes, face sheets of table tennis rackets, baseball gloves (mitts), protectors, and helmets, and other gymnastic aids.

According to the present invention, there is provided a soft, low-resilient, cured rubber composition prepared by mixing (a) 100 parts by weight of a polymeric material comprising a styrene-butadiene copolymer or a mixture of styrene-butadiene copolymers having a styrene content of 53 to 75% by weight of the copolymer or copolymer mixture, and 0 to 40% by weight of the polymeric material of another rubber ingredient, (b) 30 to 300 parts by weight of a filler, and (c) 5 to 100 parts by weight of a plasticizer, adding effective amounts of a vulcanizing agent and a vulcanizing accelerator to the mixture, and then heat curing the mixture.

This cured composition is characterized by a hardness of $40°$ or lower as measured by a type-A hardness tester as specified by the Japanese Industrial Standard, JIS 6301, a resilience of 30% or lower over a temperature range from $-10°$ C. to $50°$ C., and a tensile strength of 50 kg/cm$^2$ or higher, and these properties make it suitable for use in the abovementioned applications.

The present invention also provides a rubber foam which is a foamed modification of the above-defined composition. According to a second aspect of the present invention, there is provided a low-resilience rubber foam prepared by mixing (a) 100 parts by weight of a polymeric material comprising a styrene-butadiene copolymer or a mixture of styrene-butadiene copolymers having a styrene content of 53 to 75% by weight of the copolymer or copolymer mixture, and 0 to 40% by weight of the polymeric material of another rubber ingredient, (b) 30 to 300 parts by weight of a filler, (c) 5 to 100 parts by weight of a plasticizer, and (d) 0.5 to 60 parts by weight of a foaming agent, adding effective amounts of a vulcanizing agent and a vulcanizing accelerator to the mixture, and heating the mixture for curing and foaming.

This rubber foam is made at little expense to the low-resilience performance of the rubber composition of the invention. More particularly, the foamed, cured rubber has improved energy- and shock-absorbing ability due to a low resilience of 35% or less in a service temperature range from −10° C. to 50° C., improved vibration-absorbing properties over a frequency range of 0.01 to 1000 Hz due to low hardness, a low density as demonstrated by a bulk specific gravity of 0.7 or less, and a permanent compressive set of 5 to 50%.

The rubber and foamed rubber compositions of the present invention are particularly suitable for use in various components of shoes such as sock-linings, insoles, midsoles, inner cores, ankle pads, toe guards, and tongues.

BRIEF DESCRIPTION OF THE DRAWINGS

The above and other objects, features and advantages of the present invention will become more apparent and understandable from the following description in conjunction with the accompanying drawings, in which.

DETAILED DESCRIPTION OF THE INVENTION

Figure 1:
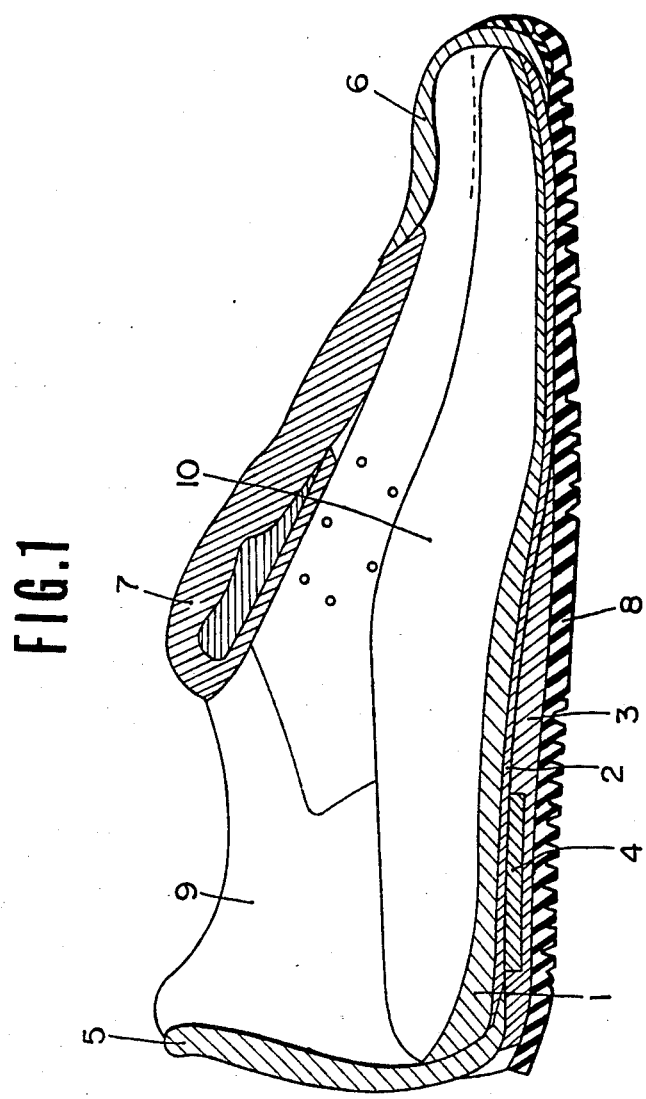
FIG. 1 is a partially cut-away side elevation of a shoe illustrating its components to which the rubber composition of the invention is applicable.

The polymeric material (a) used in the rubber and foamed rubber compositions of the invention comprises a styrene-butadiene copolymer or a mixture of styrene-butadiene copolymers and optionally, another rubber ingredient. The styrene-butadiene copolymer or styrene-butadiene copolymer mixture must have a styrene content of 53 to 75% by weight, preferably 56 to 59% by weight. The copolymer mixture is prepared by mixing styrene-butadiene copolymers having different styrene contents such that the styrene content of the mixture may fall within the above-specified range. In preparing the copolymer mixture, styrene-butadiene copolymers having styrene contents of 42 to 75% by weight may preferably be used.

The other rubber ingredient may preferably be a rubber having a glass transition temperature of −20° C. or lower. It may be selected from natural rubber, isoprene rubber, butadiene rubber, styrene-butadiene rubber, chloroprene rubber, acrylonitrile-butadiene rubber, ethylene-propylene rubber, and similar rubbers. These other rubber ingredients may be blended with the styrene-butadiene copolymer(s) in amounts of 0 to 40% by weight of the polymeric material.

The filler (b) is present in amounts of 30 to 300 parts by weight, preferably 150 to 200 parts by weight per 100 parts by weight of the polymeric material. The filler may be either a low reinforcing or a non-reinforcing filler. It may preferably be selected from calcium carbonate, barium sulfate, magnesium carbonate, dolomite, kaolin clay, calcined clay, hard clay, sericite, talc, wollastonite, bentonite, commonmica, aluminum hydroxide, zinc oxide, activated clay, halloysite, titanium oxide, gypsum, light calcium carbonate, heavy calcium carbonate, barium carbonate, strontium carbonate, diatomaceous earth, silas, silas balloon, calcium sulfate, etc.

The plasticizer (c) may be any suitable plasticizer commonly used with rubbers. It may be selected from aromatic oils, naphthenic oils, spindle oil, dioctyl phthalate, polybutene, phosphoric acid derivatives such as tricresyl phosphate, fatty acid derivatives, sulfonic acid derivatives, and the like. The plasticizer is present in amounts of 5 to 100 parts by weight per 100 parts by weight of the polymeric material. For rubber compositions, the plasticizer may preferably be present in amounts of 50 to 100 parts, especially 65 to 85 parts per 100 parts by weight of the polymeric material. For foamed rubber compositions, it may preferably be present in amounts of 5 to 60 parts, especially 20 to 40 parts per 100 parts by weight of the polymeric material.

Also included in the rubber and foamed rubber compositions of the present invention are additives commonly used in rubber formulation, for example, reinforcing agents such as carbon black and silica, and antioxidants for preventing aging such as wax.

Rubber compositions may be prepared according to the present invention by adding effective amounts of a vulcanizing agent and a vulcanizing accelerator to a mixture of the above-defined components (a), (b), and (c) and optional additives, and heat curing the resulting mixture. The vulcanizing agent may be any well-known vulcanizing agent, for example, organic peroxides, sulfur, and organic sulfur compounds such as tetramethyl thiuram disulfide, and is added in amounts of 0.5 to 10 parts by weight per 100 parts by weight of the polymeric material. Also the vulcanizing accelerator may be any well-known accelerator selected from aldehydeamines, aldehydeammonias, dithiocarbamates, guanidines, thiurams, sulfenamides, thiazoles, thioureas, and the like, and is added in amounts of 0.5 to 10 parts by weight per 100 parts by weight of the polymeric material.

The rubber compositions of the present invention may be mixed and cured in a conventional manner. The curing temperature may range from 110° C. to 180° C. Curing temperatures lower than 110° C. require a long time to complete curing whereas temperatures higher than 180° C. will result in cured rubber compositions having reduced physical properties.

Foamed rubber compositions may be obtained according to the present invention simply by using a foaming agent (d) in combination with the above-defined components (a), (b), and (c). The foaming agent may be any suitable foaming agent commonly used in rubber expansion and selected from organic foaming agents such as dinitrosopentamethylenetetramine (DPT), azodicarbonamide (AZC), p-toluenesulfonyl hydrazide (TSH), 4,4'-oxybisbenzenesulfonyl hydrazide (OBSH), etc., and inorganic foaming agents such as sodium hydrogen carbonate. The foaming agent is present in amounts of 0.5 to 60 parts, preferably 2 to 30 parts by weight per 100 parts by weight of the polymeric material. Low-resilience foamed rubbers may be obtained by adding effective amounts of a vulcanizing agent and a vulcanizing accelerator as mentioned above to a mixture of the above-defined four components (a)-(d) and optional additives and heating the resulting mixture for foaming and curing. In this case, the rubber compositions may be mixed and cured in a conventional manner. The curing temperature may range from 110° to 180° C. Curing temperatures of lower than 110° C. will be too low to complete curing within an acceptable time and to fully decompose the foaming agent. Temperatures higher than 180° C. will result in foamed, cured rubber compositions which have reduced physical properties and are unstable.

Figure 2:
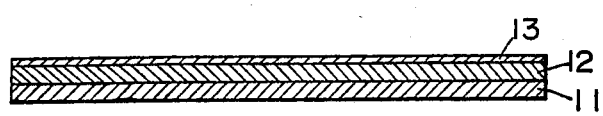
FIGS. 2, 3, and 4 are cross-sectional views of different laminates for use as a shoe insole, respectively.
Figure 3:
Figure 4:
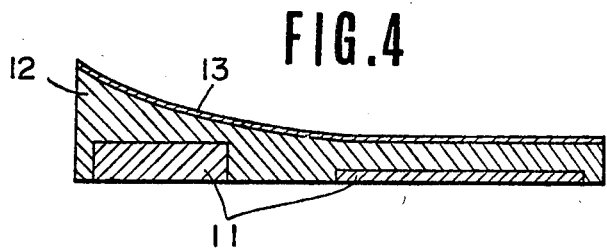

The rubber and foamed rubber compositions of the invention have improved shock-absorbing properties which make them suitable in a variety of applications, particularly as shoe-making materials. More specifically, the compositions of the invention are suitable for manufacturing shoes capable of protecting foot joints and nervous systems by absorbing excessive impact force occurring on walking and running. They are also suitable to make various parts of shoes such as gymnastic shoes and medical shoes, for example, as shown in FIG. 1, a shoe-lining 1, insole 2, mid-sole 3, inner core 4, ankle pad 5, toe guard 6, tongue 7, outer sole 8, upper 9, and arch support 10. In the manufacture of insoles, making them from the composition of the invention alone, of course, provides satisfactory performance although insoles of better performance may be obtained by assembling the composition of the invention with another rubber material into a laminate. As shown in FIGS. 2–4, a layer 11 of the present rubber composition is attached to another layer 12 of an ethylene-vinyl acetate copolymer, polyurethane foam, rubber foam, or rubber composition based on general-purpose rubbers, resulting in a laminate which has enhanced shock-absorbing and cushioning properties. The general-purpose rubbers used in combination may be selected from natural rubber, isoprene rubber, butadiene rubber, styrene-butadiene rubber, chloroprene rubber, acrylonitrile-butadiene rubber, ethylene-propylene rubber and other rubbers as long as they have a glass transition temperature of lower than $-20°$ C. The rubber foams include both foamed materials prepared by vulvanizing and expanding organic or inorganic foaming agent-containing rubbers as well as so-called foam rubber prepared from latex. In FIGS. 2–4, numeral 13 designates a fabric lining attached to the top surface of the layer 12.

Following are examples of the present invention, which are set forth by way of illustration and not by way of limitation. All parts are by weight.

EXAMPLES 1–8 AND COMPARATIVE EXAMPLES 1–4

Cured samples were prepared by concurrently mixing and milling 100 parts of styrene-butadiene copolymers having different styrene contents as shown in Table 1, 150–200 parts of a filler, and 50–80 parts of a plasticizer, and adding a vulcanizing agent and a vulcanizing accelerator to the mixture, followed by heat curing.

These samples were determined for hardness, resilience, and tensile properties. The results are shown in Table 1. Hardness measurement was made using a type A hardness tester as specified in JIS 6301, and resilience measurement was made using a Dunlop tripsometer. Tensile properties, namely, tensile strength Tb and elongation Eb were measured on DIN-3 type specimens using an Instron tensile tester at room temperature and a pulling rate of 100 mm/min.

For the sake of comparison, similar experiments were made using butyl rubber and urethane elastomer. The results are shown in Table 2.

TABLE 1

|  | Example |  |  |  |  |  |  |  |
|---|---|---|---|---|---|---|---|---|
|  | 1 | 2 | 3 | 4 | 5 | 6 | 7 | 8 |
| Composition, parts by weight |  |  |  |  |  |  |  |  |
| Styrene-butadiene copolymer |  |  |  |  |  |  |  |  |
| type 1[*1] | 100 | 100 | 75 | 75 | 70 | 70 | 60 | 65 |
| type 2[*2] | — | — | 25 | 25 | 30 | 25 | 30 | 30 |
| type 3[*3] |  |  |  |  |  | 5 | 10 | 15 |
| Filler (BaSO$_4$) | 150 | 200 | 150 | 200 | 150 | 200 | 200 | 200 |
| Plasticizer (aromatic oil) | 70 | 70 | 70 | 80 | 80 | 80 | 80 | 80 |
| Zinc oxide | 5.0 | 5.0 | 5.0 | 5.0 | 5.0 | 5.0 | 5.0 | 5.0 |
| Stearic acid | 3.0 | 3.0 | 3.0 | 3.0 | 3.0 | 3.0 | 3.0 | 3.0 |
| Sulfur | 1.5 | 1.5 | 1.5 | 1.5 | 1.5 | 1.5 | 1.5 | 1.5 |
| Accelerator A[*4] | 1.0 | 1.0 | 1.0 | 1.0 | 1.0 | 1.0 | 1.0 | 1.0 |
| Accelerator B[*5] | 0.5 | 0.5 | 0.5 | 0.5 | 0.5 | 0.5 | 0.5 | 0.5 |
| Properties |  |  |  |  |  |  |  |  |
| Hardness at 20° C. | 29 | 36 | 26 | 29 | 28 | 25 | 29 | 29 |
| Resilience at $-10°$ C., % | 21.6 | 17.8 | 16.4 | 14.9 | 14.9 | 12.0 | 10.1 | 12.3 |
| Resilience at 20° C., % | 0 | 2.2 | 0.09 | 1.0 | 1.1 | 0.09 | 0 | 0 |
| Resilience at 45° C., % | 19.3 | 14.2 | 15.7 | 14.6 | 14.6 | 15.0 | 14.2 | 13.1 |
| Tb, kg/cm$^2$ | 58.6 | 57.8 | 59.7 | 58.3 | 58.6 | 52.3 | 53.1 | 51.3 |
| Eb, % | 620 | 640 | 600 | 645 | 600 | 670 | 670 | 670 |
| Styrene content[*6], % | 65.0 | 65.0 | 66.8 | 66.8 | 67.1 | 66.3 | 66.1 | 66.6 |

[*1]styrene content 65 wt %
[*2]styrene content 72 wt %
[*3]styrene content 55 wt %
[*4]2-mercaptobenzothiazole
[*5]di-o-tolyl-guanidine
[*6]based on the total weight of styrene-butadiene copolymers.
Vulcanizing conditions: 160° C., 40 minutes.

TABLE 2

|  | Comparative Example |  |  |  |
|---|---|---|---|---|
|  | 1 | 2 | 3 | 4 |
| Composition, parts |  |  |  |  |
| Butyl rubber | 100 | 100 | 100 | commercially available urethane elastomer |
| Filler (BaSO$_4$) | 150 | — | — |  |
| Plasticizer (aromatic oil) | 30 | — | — |  |
| Carbon black | — | 50.0 | — |  |
| Zinc oxide | 5.0 | 5.0 | 5.0 |  |
| Stearic acid | 3.0 | 1.0 | 1.0 |  |
| Sulfur | 2.0 | 2.0 | 2.0 |  |
| Accelerator B | 0.5 | — | — |  |
| Accelerator C[*7] | 1.0 | 1.0 | 1.0 |  |
| Properties |  |  |  |  |
| Hardness at 20° C. | 26 | 62 | 36 | 8 |
| Resilience at $-10°$ C., % | 6.6 | 8.0 | 6.6 | — |
| Resilience at 20° C., % | 17.6 | 24.0 | 46.6 | 20.0 |
| Resilience at 45° C., % | 30.6 | 41.0 | 64.2 | 40.0 |
| Tb, kg/cm$^2$ | 20.5 | 201.6 | 19.8 | 1.4 |

TABLE 2-continued

|  | Comparative Example | | | |
|---|---|---|---|---|
|  | 1 | 2 | 3 | 4 |
| Eb, % | 370 | 600 | 368 | 700 |

*7 tetramethyl thiuram monosulfide

Comparison of Table 1 with Table 2 reveals that the rubber compositions of the present invention exhibit lower resilience over a wider temperature range, lower hardness, and higher strength than the conventional rubber compositions.

EXAMPLES 9-12

Compositions having formulations shown in Table 3 were milled for 30 minutes through a roll mill having a surface temperature of 60° C. into a sheet, placed in a mold cavity of 10 cm by 10 cm by 1 cm, heated to 140° C. under a pressure of 90 kg/cm$^2$ for 25 minutes, and then taken out of the mold. The foamed samples were determined for hardness, resilience, and tensile properties to give the data shown in Table 4.

For the sake of comparison, similarly processed samples of commercially available chloroprene rubber foam, natural rubber foam, EVA foam, and RB foam were also determined for the same physical properties to give the data shown in Table 5.

TABLE 3

|  | Example | | | |
|---|---|---|---|---|
| Composition | 9 | 10 | 11 | 12 |
| Styrene-butadiene copolymer | | | | |
| type 1*1 | 65 | 65 | 65 | 50 |
| type 2*2 | 30 | 30 | 30 | 45 |
| type 3*3 | 5 | 5 | 5 | 5 |
| Filler (BaSO$_4$) | 100 | 100 | 100 | 100 |
| Plasticizer (aromatic oil) | 30 | 30 | 30 | 30 |
| Zinc oxide | 5.0 | 5.0 | 5.0 | 5.0 |
| Stearic acid | 3.0 | 3.0 | 3.0 | 3.0 |
| Carbon | 1.0 | 1.0 | 1.0 | 1.0 |
| Sulfur | 2.1 | 2.1 | 2.1 | 2.1 |
| Accelerator*8 | 0.8 | 0.8 | 0.8 | 0.8 |
| Foaming agent*9 | 5 | 10 | 20 | 20 |

*1, 2, 3 see Table 1
*8 N—cyclohexyl-2-benzothiazole sulfenamide
*9 azodicarbonamide foaming agent

TABLE 4

|  | Example | | | |
|---|---|---|---|---|
|  | 9 | 10 | 11 | 12 |
| Hardness at 20° C. | 34 | 19 | 7 | 7 |
| Apparent specific gravity | 0.417 | 0.302 | 0.185 | 0.182 |
| Resilience at −10° C., % | 6.3 | 7.5 | 10.3 | 11.3 |
| Resilience at 24° C., % | 3.1 | 3.7 | 8.6 | 9.7 |
| Resilience at 40° C., % | 4.3 | 8.3 | 10.7 | 13.5 |
| Styrene content, % | 66.6 | 66.6 | 66.6 | 67.7 |

TABLE 5

|  | Comparative Example | | | |
|---|---|---|---|---|
|  | 5 Chloroprene foam | 6 EVA foam | 7 Commercially available rubber sponge | 8 RB sponge |
| Hardness at 20° C. | 5 | 34 | 28 | 25 |
| Apparent specific gravity | 0.189 | 0.013 | 0.190 | 0.62 |
| Resilience at −10° C., % | 48.9 | 54.3 | 63.0 | 24.8 |
| Resilience at 24° C., % | 51.8 | 67.6 | 65.5 | 48.3 |
| Resilience at 40° C., % | 62.3 | 68.0 | 64.3 | 51.4 |

Comparison of Table 4 with Table 5 reveals that the rubber foams of the present invention exhibit lower resilience over a wider temperature range than the conventional foams.

EXAMPLES 13-16

Compositions having formulations shown in Table 6 were milled for 30 minutes through a roll mill having a surface temperature of 70° C. into a sheet, placed into a mold cavity of 25 cm by 30 cm by 1.5 cm, heated to 140° C. under a pressure of 90 kg/cm$^2$ for 25 mintes, and then taken out of the mold. The results are shown in Table 6.

Similar measurements were made on samples of commercially available chloroprene rubber foam, natural rubber foam, EVA foam, RB foam, and special urethane foam (trademark, Solbothane).

TABLE 6

|  | Example | | | | Comparative Example* | | | | |
|---|---|---|---|---|---|---|---|---|---|
|  | 13 | 14 | 15 | 16 | 9 | 10 | 11 | 12 | 13 |
| Composition, parts by weight | | | | | | | | | |
| High styrene content styrene-butadiene copolymer | 80 | 80 | 70 | 70 | | | | | |
| Styrene content | 60% | 55% | 60% | 55% | natural rubber foam | | | | |
| Natural rubber | 20 | 20 | 30 | 30 | | EVA foam | | | |
| Filler (calcium carbonate) | 80 | 80 | 80 | 80 | | | RB foam | | |
| Plasticizer (aromatic oil) | 30 | 30 | 30 | 30 | | | | | |
| Zinc oxide | 5 | 5 | 5 | 5 | | | | chloroprene foam | |
| Stearic acid | 3 | 3 | 3 | 3 | | | | | urethane foam (Solbothane ®) |
| Carbon | 5 | 5 | 5 | 5 | | | | | |
| Sulfur | 2.5 | 2.5 | 2.5 | 2.5 | | | | | |
| Accelerator*8 | 2.0 | 2.0 | 2.0 | 2.0 | | | | | |
| Foaming agent*9 | 5 | 5 | 5 | 5 | | | | | |
| Antioxidant | 1 | 1 | 1 | 1 | | | | | |
| Properties | | | | | | | | | |
| Apparent specific gravity, g/cm$^3$ | 0.441 | 0.456 | 0.445 | 0.463 | 0.464 | 0.013 | 0.62 | 0.189 | 1.31 |
| Hardness at 20° C., Shore A | 12 | 13 | 10 | 10 | 9 | 34 | 25 | 5 | 8 |
| Tensile strength at break, kg/cm$^2$ | 31.4 | 36.3 | 45.3 | 47.8 | 6.1 | 6.9 | 31.0 | — | 1.22 |

TABLE 6-continued

|  | Example | | | | Comparative Example* | | | | |
| --- | --- | --- | --- | --- | --- | --- | --- | --- | --- |
|  | 13 | 14 | 15 | 16 | 9 | 10 | 11 | 12 | 13 |
| Elongation at break, % | 403 | 445 | 473 | 513 | 240 | 90 | 220 | — | 610 |
| 100% modulus | 8.5 | 7.4 | 6.8 | 6.3 | 3.07 | — | 21.5 | — | 0.23 |
| 300% modulus | 21.1 | 18.6 | 17.3 | 16.8 | — | — | — | — | 0.34 |
| Permanent compressive set**, % | 36.3 | 30.3 | 23.5 | 19.6 | 0.67 | — | — | — | 68 |
| Resilience at −10° C., % | 24.5 | 18.5 | 27.0 | 14.6 | 56.0 | 54.3 | 24.8 | 48.9 | 15.4 |
| Resilience at 20° C., % | 4.0 | 5.0 | 4.5 | 7.3 | 58.0 | 67.6 | 48.3 | 51.8 | 20.0 |
| Resilience at 50° C., % | 18.5 | 24.0 | 20.0 | 26.3 | 61.0 | 68.0 | 51.4 | 62.3 | 39.5 |

*all commercially available foams
*[8], *[9] see Table 3
**test conditions: 70° C., 48 hours, 75% compression.

As seen from Table 6, the rubber foams of the present invention exhibit lower resilience over a wider temperature range than the conventional rubber foams.

Samples of Example 13 and Comparative Examples 9, 10 and 13 were further determined for shock-absorbing performance. Using a drop-weight impact tester under conditions of a drop weight of 5 kg, a drop height of 10 cm, and a drop weight-sample contact area of 9 cm², the maximum acceleration was measured. The results are shown in Table 7, which proves that the low-resilience rubber foams of the invention have improved shock-absorbing properties.

TABLE 7

|  | Example | Comparative Example | | |
| --- | --- | --- | --- | --- |
|  | 13 | 9 | 10 | 13 |
| Maximum acceleration, G | 39 | 190 | 180 | 68 |
| Thickness, mm | 5.0 | 4.0 | 4.9 | 5.0 |
| Thickness-reduced maximum acceleration, G-mm | 195 | 760 | 882 | 340 |

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What we claim is:

1. A cellular low-resilience rubber foam having a resilience of 35% or lower in a service temperature range of from −10° C. to 50° C. and a permanent compressive set of 5 to 50% prepared by mixing
   (a) 100 parts by weight of a polymeric material comprising a styrene-butadiene copolymer or a mixture of styrene-butadiene copolymers having a styrene content of 53 to 75% by weight of the copolymer or copolymer mixture, and 0 to 40% by weight of the polymeric material of another rubber ingredient,
   (b) 30 to 300 parts by weight of a filler,
   (c) 5 to 100 parts by weight of a plasticizer, and
   (d) 0.5 to 60 parts by weight of a foaming agent, adding effective amounts of a vulcanizing agent and a vulcanizing accelerator to the mixture, and heating the mixture for curing and foaming.

2. A rubber foam according to claim 1 wherein the plasticizer (c) is present in an amount of 5 to 60 parts by weight per 100 parts by weight of the polymeric material.

3. A low-resilient, cellular, cured foam rubber composition having a resilience of 35% or lower over a temperature range of from −10° C. to 50° C., a bulk specific gravity of 0.7 or less, and a permanent compressive set of 5 to 50%, prepared by:
   blending 100 parts by weight of a mixture of styrene-butadiene copolymers having a styrene content of from 53 to 75% by weight of the copolymer mixture and being prepared by mixing styrene-butadiene copolymers having styrene contents of 42 to 75% by weight of the styrene-butadiene copolymer, 30 to 300 parts by weight of a low-reinforcing or non-reinforcing filler, 5 to 100 parts by weight of a plasticizer and 0.5 to 60 parts by weight of a foaming agent;
   adding effective amounts of a vulcanizing agent and a vulcanizing accelerator to said blend; and
   heat curing said blend to produce said foamed rubber composition.

4. A low-resilient, cellular cured foamed shoe making rubber composition having a resilience of 35% or lower over a temperature range of from −10° C. to 50° C., a bulk specific gravity of 0.7 or less, and a permanent compressive set of 5 to 50%, comprising a heat cured, vulcanized foamed blend of 100 parts by weight of a polymeric material comprising a mixture of styrene-butadiene copolymers having a styrene content of from 53 to 75% by weight of said copolymer mixture, said mixture being prepared by mixing styrene-butadiene copolymers having styrene contents of 42 to 75% by weight of the styrene-butadiene copolymer, 30 to 300 parts by weight of a low-reinforcing or non-reinforcing filler, 5 to 100 parts by weight of a plasticizer and 0.5 to 60 parts by weight of a foaming agent.

5. A process for preparing a low-resilient, cellular, cured foamed rubber composition having a resilience of 35% or lower over a temperature range of from −10° C. to 50° C., a bulk specific gravity of 0.7 or less, and a permanent compressive set of 5 to 50% which comprises:
   blending 100 parts by weight of a polymeric material comprising a mixture of styrene-butadiene copolymers having a styrene content of from 53 to 75% by weight of said copolymer mixture and being prepared by mixing styrene-butadiene copolymers having styrene contents of 42 to 75% by weight of the styrene-butadiene copolymer, 30 to 300 parts by weight of a low-reinforcing or non-reinforcing filler, 5 to 100 parts by weight of a plasticizer and 0.5 to 60 parts by weight of a foaming agent;
   adding effective amounts of a vulcanizing agent and a vulcanizing accelerator to said blend; and
   heat curing said blend to produce said cured foamed rubber composition.

6. A process for preparing a low-resilient, cellular foamed rubber composition useful as a shoe making material having a resilience of 35% or lower over a temperature range of from −10° C. to 50° C., a bulk specific gravity of 0.7 or less, and a permanent compressive set of 5 to 50%, which comprises:

blending 100 parts by weight of a polymeric material comprising a mixture of styrene-butadiene copolymers having a styrene content of from 53 to 75% by weight of said copolymer mixture and being prepared by mixing styrene-butadiene copolymers having styrene contents of 42 to 75% by weight of the styrene-butadiene copolymer, 30 to 300 parts by weight of a low-reinforcing or non-reinforcing filler, 5 to 100 parts by weight of a plasticizer, and 0.5 to 60 parts by weight of a foaming agent;

adding effective amounts of a vulcanizing agent and a vulcanizing accelerator to said blend; and heat curing said blend to produce said shoe making foamed rubber composition.

7. The foamed rubber composition of claim 3, wherein said styrene content of the copolymer or copolymer mixture ranges from 56 to 59% by weight of said copolymer or copolymer mixture.

8. The foamed rubber composition of claim 3, wherein said styrene content of said copolymer or copolymer mixture is about 55%.

9. The foamed rubber composition of claim 3, wherein said styrene content of said copolymer or copolymer mixture is about 65%.

10. The cured foamed shoe making rubber composition of claim 4, wherein said styrene content of said copolymer or copolymer mixture ranges from 56 to 59% by weight of said copolymer or copolymer mixture.

11. The cured foamed shoe making rubber composition of claim 4, wherein said styrene content of said copolymer mixture is about 55%.

12. The cured foamed shoe making rubber composition of claim 4, wherein said styrene content of said copolymer mixture is about 65%.

13. The foamed rubber composition of claim 3, which includes a second rubber ingredient which comprises a rubber composition having a glass transition temperature of −20° C. or less.

14. The cured foamed shoe making rubber composition of claim 4, which includes a second rubber ingredient which comprises a rubber composition having a glass transition temperature of −20° C. or less.

15. The process of claim 5, wherein said styrene content of said copolymer mixture ranges from 56 to 59% by weight.

16. The process of claim 5, wherein said styrene content of said copolymer mixture is about 55%.

17. The process of claim 15, wherein said styrene content of said copolymer mixture is about 65%.

18. The process of claim 5, wherein a second rubber ingredient comprising a rubber composition having a glass transition temperature of −20° C. or less is blended into the composition.

19. The process of claim 6, wherein the styrene content of said copolymer blend ranges from 56 to 59% by weight.

20. The process of claim 6, wherein said styrene content of said copolymer blend of said shoe making foamed rubber composition is about 55%.

21. The process of claim 6, wherein said styrene content of said copolymer blend of said shoe making foamed rubber composition is about 65%.

22. The process of claim 6, further including the step of attaching a layer of said cured foamed rubber composition to a second layer of a shoe making material to form a laminate which has enhanced shock-absorbing and cushioning properties.

23. The process of claim 22, wherein said second layer is selected from at least one member of the group consisting of ethylene-vinylacetate copolymer, polyurethane foam, rubber foam, or rubber compositions based on general purpose rubbers.

24. The process fo claim 23, wherein said second layer comprises a rubber composition based on general purpose rubbers, having a glass transition temperature of lower than −20° C.

25. The shoe making laminate prepared according to the process of claim 22.

26. The shoe making laminate prepared according to the process of claim 23.

27. The foamed rubber composition of claim 5, wherein said filler is selected from the group consisting of calcium carbonate, barium sulfate, magnesium carbonate, dolomite, kaolin clay, calcined clay, hard clay, sericite, talc, wollastonite, bentonite, common mica, aluminum hydroxide, zinc oxide, activated clay, halloysite, titanium oxide, gypsum, light calcium carbonate, heavy calcium carbonate, barium carbonate, strontium carbonate, diatomaceous earth, silas, silas balloon, calcium sulfate and mixtures thereof.

28. The cured foamed shoe making rubber composition of claim 4, wherein the filler is selected from the group consisting of calcium carbonate, barium sulfate, magnesium carbonate, dolomite, kaolin clay, calcined clay, hard clay, sericite, talc, wollastonite, bentonite, common mica, aluminum hydroxide, zinc oxide, activated clay, halloysite, titanium oxide, gypsum, light calcium carbonate, heavy calcium carbonate, barium carbonate, strontium carbonate, diatomaceous earth, silas, silas balloon, calcium sulfate and mixtures thereof.

29. The process of claim 5, wherein said filler is selected from the group consisting of calcium carbonate, barium sulfate, magnesium carbonate, dolomite, kaolin clay, calcined clay, hard clay, sericite, talc, wollastonite, bentonite, common mica, aluminum hydroxide, zinc oxide, activated clay, halloysite, titanium oxide, gypsum, light calcium carbonate, heavy calcium carbonate, barium carbonate, strontium carbonate, diatomaceous earth, silas, silas balloon, calcium sulfate and mixtures thereof.

30. The foamed rubber composition of claim 3, wherein the foaming agent is selected from the group consisting of
dinitrosopentamethylenetetramine, azodicarbonamide, p-toluenesulfonyl hydrazide, 4,4′-oxybisbenzenesulfonyl hydrazide and sodium hydrogen carbonate.

31. The rubber composition of claim 4, wherein the foaming agent is selected from the group consisting of
dinitrosopentamethylenetetramine, azodicarbonamide,
p-toluenesulfonyl hydrazide, 4,4′-oxybisbenzenesulfonyl hydrazide and sodium hydrogen carbonate.

32. The process of claim 5, wherein the foaming agent is selected from the group consisting of
dinitrosopentamethylenetetramine, azodicarbonamide, p-toluenesulfonyl hydrazide, 4,4′-oxybisbenzenesulfonyl hydrazide and sodium hydrogen carbonate.

33. The foamed rubber composition according to claim 3, wherein the plasticizer is present in an amount of 5 to 60 parts by weight per 100 parts by weight of the styrene-butadiene copolymers.

34. The foamed rubber composition according to claim 4, wherein the plasticizer is present in an amount of 5 to 60 parts by weight per 100 parts by weight of the styrene-butadiene copolymers.

35. The process according to claim 5, wherein the plasticizer is present in an amount of 5 to 60 parts by weight per 100 parts by weight of the styrene-butadiene copolymers.

* * * * *